J. S. DEDERICH.
DEVICE FOR LOOSENING COMPRESSED MATERIAL.
APPLICATION FILED MAR. 5, 1921.
1,398,129.  Patented Nov. 22, 1921.
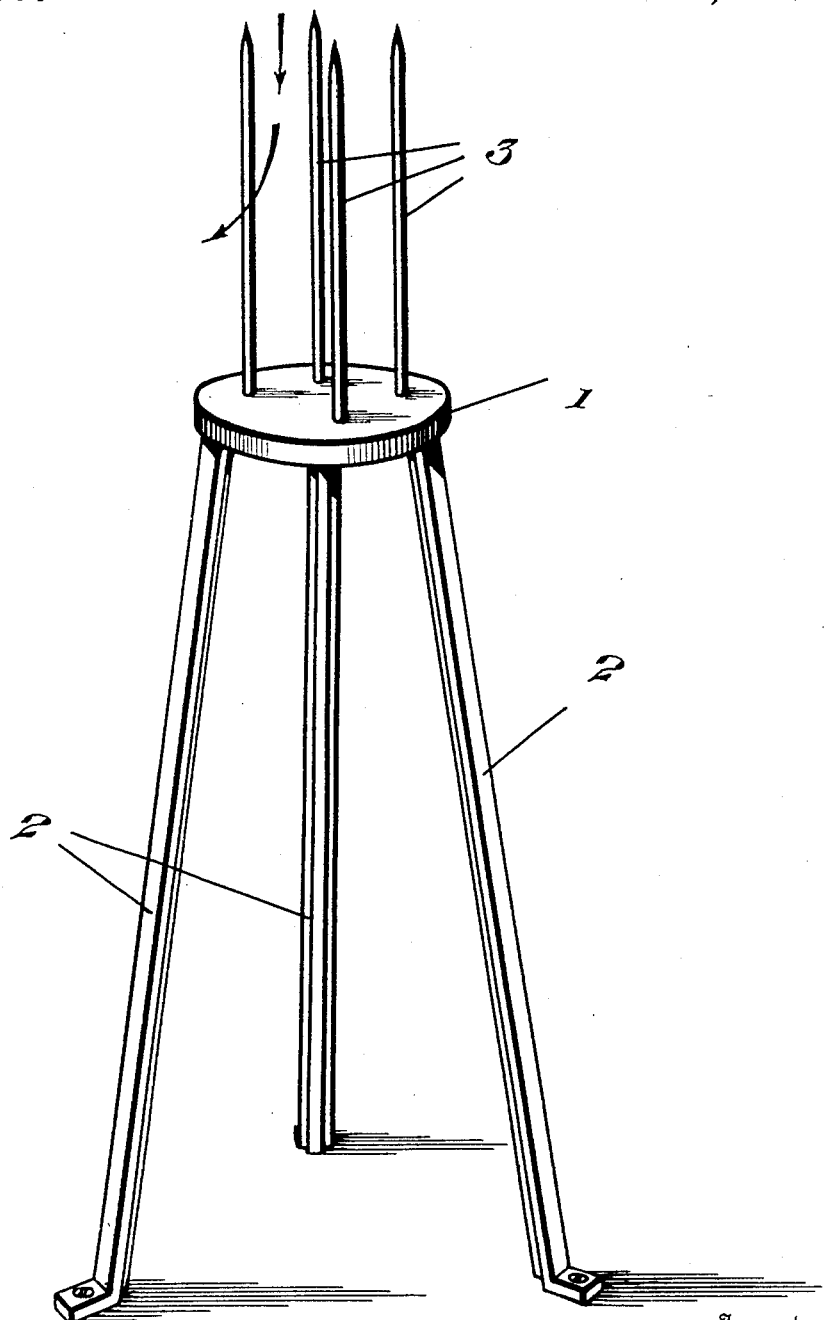
Inventor
J. S. DEDERICH
By W. J. Fitz Herald
Attorney

UNITED STATES PATENT OFFICE.

JOSEPH S. DEDERICH, OF RACINE, WISCONSIN.

DEVICE FOR LOOSENING COMPRESSED MATERIAL.

1,398,129.   Specification of Letters Patent.   Patented Nov. 22, 1921.

Application filed March 5, 1921. Serial No. 450,070.

*To all whom it may concern:*

Be it known that I, JOSEPH S. DEDERICH, a citizen of the United States, residing at Racine, in the county of Racine and State of Wisconsin, have invented certain new and useful Improvements in Devices for Loosening Compressed Material; and I do hereby declare the following to be a full, clear, and exact description of the invention, such as will enable others skilled in the art to which it appertains to make and use the same.

The present invention relates to a device for loosening or separating compressed material, such as baled excelsior, moss, and the like, and aims to provide a novel and improved device of that kind, which is simple and inexpensive in construction, as well as thoroughly practical and efficient in use.

A further object is the provision of such a device upon which the baled or compressed material can be struck, for tearing or loosening the material from the bale or bundle.

With the foregoing and other objects in view, which will be apparent as the description proceeds, the invention resides in the construction and arrangement of parts hereinafter described and claimed, it being understood that changes can be made within the scope of what is claimed, without departing from the spirit of the invention.

The invention is illustrated in the accompanying drawing, wherein the figure is a perspective view of the device.

In carrying out the invention, there is provided a stand having the top plate 1 of metal or other suitable material, secured to and supported by legs 2, the feet of which can be rigidly secured on the floor or base. As shown, the legs 2 diverge downwardly, to brace the stand. The top plate 1 is preferably circular, and has a number (4 as shown) of prongs or picking fingers 3 rising perpendicularly therefrom, with their upper ends pointed or sharpened.

In using the device, the bale of excelsior, moss, or other material, is taken in the hands and is swung downwardly onto the prongs 3, and, at the same time, the bale or bundle is drawn or pulled toward the operator who standing at one side of the stand or pedestal. Thus, if the operator is at the left of the stand, as shown in the drawing, the bundle or bale of material is moved in the direction of the arrows, as shown in the drawing. The material is thus impinged on the prongs and being pulled laterally, will loosen or tear the material from the bundle or bale. The operation can be repeated if necessary or desired, and the loosened material will drop to the floor around the stand. Any material clinging to the prongs 3 can be readily removed therefrom. Furthermore, the material in being beaten down on the plate 1, will assist in breaking up the bale or bundle.

Having thus described the invention, what is claimed as new is:

A device for loosening compressed material comprising a stand of small outline and unobstructed on all sides thereof, so that the operator can walk around said stand and use same from any side thereof, said stand including upwardly converging legs to be secured rigidly on a floor or base, a top plate of small outline secured on said legs, and a few relatively long prongs rising from said plate and spaced apart a relatively large distance.

In testimony whereof I have signed my name to this specification in the presence of two subscribing witnesses.

JOSEPH S. DEDERICH.

Witnesses:
J. V. ROHAN,
CLARA F. SCHULZ.